United States Patent
Leprieur et al.

(10) Patent No.: US 6,959,201 B2
(45) Date of Patent: Oct. 25, 2005

(54) METHOD OF SWITCHING FROM A FIRST MOBILE RADIO MODE TO A SECOND MOBILE RADIO MODE AND AN ASSOCIATED MULTIMODE MOBILE TERMINAL

(75) Inventors: Philippe Leprieur, Asnieres (FR); Alexandre Da Rocha, Santa Clara, CA (US); Laurent Rouvellou, Paris (FR)

(73) Assignee: Alcatel, Paris (FR)

( * ) Notice: Subject to any disclaimer, the term of this patent is extended or adjusted under 35 U.S.C. 154(b) by 403 days.

(21) Appl. No.: 10/179,234

(22) Filed: Jun. 26, 2002

(65) Prior Publication Data
US 2003/0003951 A1  Jan. 2, 2003

(30) Foreign Application Priority Data
Jun. 28, 2001 (FR) .................................. 01 08538

(51) Int. Cl.⁷ .............................................. H04B 1/38
(52) U.S. Cl. .............................. 455/552.1; 455/553.1; 455/556.1; 455/556.2; 455/127.4; 455/188.1; 455/205
(58) Field of Search ........................... 455/556.1, 556.2, 455/127.4, 181.1, 188.1, 204, 205, 418, 522.1, 455/553.1

(56) References Cited

U.S. PATENT DOCUMENTS

| | | | |
|---|---|---|---|
| 5,422,931 A | * | 6/1995 | Austin-Lazarus et al. ............... 455/553.1 |
| 5,640,679 A | * | 6/1997 | Lundqvist et al. .......... 455/525 |
| 6,282,431 B1 | * | 8/2001 | Konno ........................ 455/425 |
| 6,741,836 B2 | * | 5/2004 | Lee et al. ................... 455/41.2 |
| 2002/0102987 A1 | * | 8/2002 | Souisse et al. .............. 455/454 |
| 2002/0155862 A1 | * | 10/2002 | Ormson ...................... 455/561 |

FOREIGN PATENT DOCUMENTS

| | | | |
|---|---|---|---|
| EP | 0 966 116 A2 | 12/1999 | |
| EP | 1 073 303 A1 | 1/2001 | |
| EP | 1089578 A2 | * 4/2001 | ............ H04Q 7/32 |
| WO | WO9638991 | 12/1996 | |

* cited by examiner

*Primary Examiner*—Nick Corsaro
*Assistant Examiner*—Minh D. Dao
(74) *Attorney, Agent, or Firm*—Sughrue Mion, PLLC

(57) ABSTRACT

The present invention relates to a method of switching from a first mobile radio mode to a second mobile radio mode in a multimode mobile radio terminal having a first part and a second part respectively operating in compliance with first and second radio access technologies and respectively provided with first and second clocks, the method including the following steps:

- locking the first part of the mobile terminal to a first mobile radio mode associated with an first clock;
- the mobile terminal calculating the time shift between the clocks of the two mobile radio modes;
- correcting the time of a second part of the terminal using the calculated time shift; and
- switching a second part of the mobile terminal to a second mobile radio mode associated with the second clock.

7 Claims, 1 Drawing Sheet

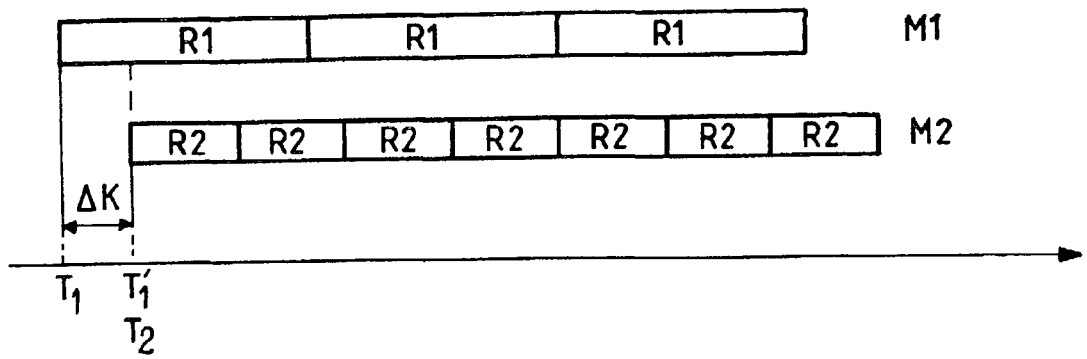
FIG_1
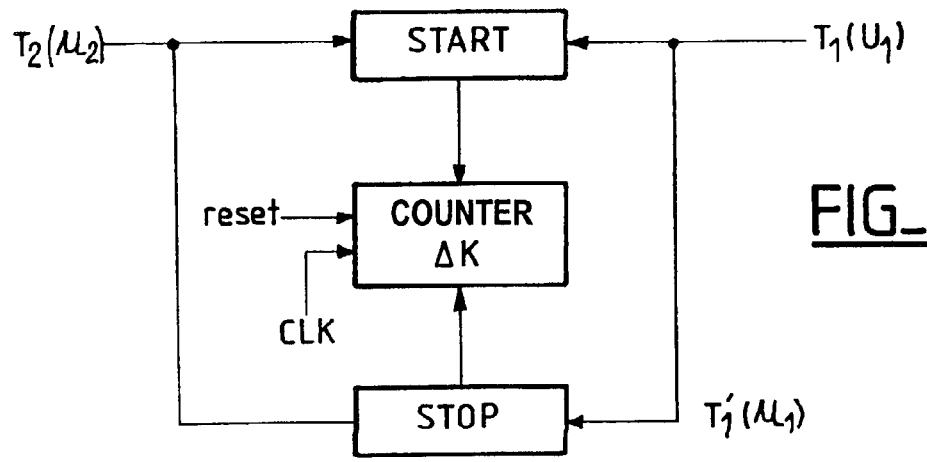
FIG_2
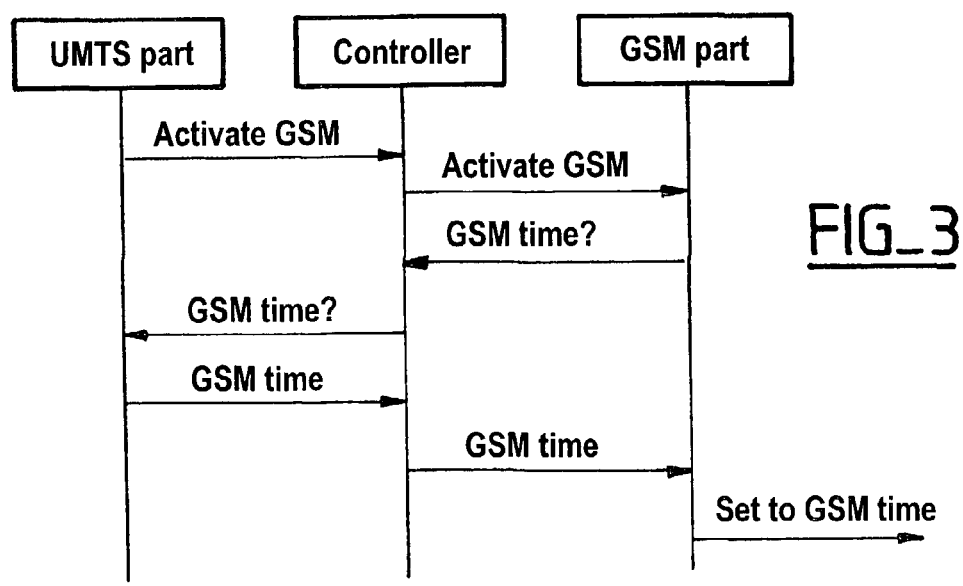
FIG_3

METHOD OF SWITCHING FROM A FIRST MOBILE RADIO MODE TO A SECOND MOBILE RADIO MODE AND AN ASSOCIATED MULTIMODE MOBILE TERMINAL

The present invention relates to mobile telecommunications and more specifically to the use of multimode mobile radio terminals able to communicate in any of two or more mobile radio modes.

BACKGROUND OF THE INVENTION

Mobile radio modes known at present to the person skilled in the art include the second generation Global System for Mobile communication (GSM) mode, the third generation Universal Mobile Telecommunication System (UMTS) mode, and the Personal Communication Service (PCS) mode in use in America, for example.

Conventionally, a mobile radio terminal sets up calls via base stations using a radio access technology (RAT). Different radio access technologies can coexist, with base stations dedicated to a first mobile radio mode, for example GSM base transceiver stations (BTS), and stations dedicated to a second mobile radio mode, for example UMTS Terrestrial Radio Access Network (UTRAN) antennas. Other radio access technologies may be introduced in the future, with other mobile radio modes, and become part of the problem addressed by the invention.

Given this background, it would appear to be crucial that a mobile radio terminal be able to operate in accordance with any standard associated with any current mobile radio mode, i.e. with any of the radio access technologies associated with said modes. This interworking is essential for three main reasons: to maintain continuity of service during a call, to maintain continuity of service between calls, when the terminal is in standby mode, and to support measurements.

To set up a call, a mobile terminal must be associated with a base station of the geographical area in which it is located, which may be dedicated to any of the radio access technologies currently in use in the territory concerned. The base station passes the call to a controller which passes it to a switching center which directs the call to the base station associated with the destination terminal or to another network associated with the destination terminal (Internet, public switched telecommunication/telephone network (PSTN), etc.). If the mobile terminal moves around while a call is in progress, handover is required to maintain continuity of service. The handover can be between base stations using the same or different radio access technologies.

Between calls, a mobile terminal must remain in a standby state, in which it is also associated with a base station. If it is moving around, the mobile terminal can perform a reselection operation to connect to a base station in a new geographical area. Reselection is also required if the mobile terminal is communicating in a data packet mode, for example if it is using the General Packet Radio Service (GPRS).

Finally, a multimode mobile radio terminal must be able to support regular measurement of signals received from a base station using a first mode (for example the GSM mode) even though it is connected by a radio link to a base station using a different mode (for example the UMTS mode). Such measurements are often imposed by the standardization bodies that regulate existing and projected mobile radio services.

Interworking of a plurality of radio access technologies (for handover, reselection, measurements) is not necessarily guaranteed, in particular because each mobile radio mode has its own clock. Thus in the case of the GSM and UMTS modes, the periods of the radio frames for calls are not the same, being 4.615 ms for the GSM and 10 ms for the UMTS. This is not merely a question of lack of synchronization between base stations, but a real difference in the time frame of reference between the two standards.

A multimode mobile terminal connected by a radio link to a base station using a first mode must therefore be in a position to know the exact time for at least one other mode. It is therefore important for a multimode mobile terminal to be able to determine the time shift between two mobile radio modes in order to be able to switch from one to the other during a call, when in standby mode, or to carry out measurements.

One solution is to continue to listen regularly to one mode while using another mode (for example, listening to GSM stations when communicating with UMTS stations). This kind of solution is not the optimum, however, because it is costly in terms of energy consumption and therefore in mobile terminal battery life.

OBJECTS AND SUMMARY OF THE INVENTION

An object of the present invention is therefore to propose a method of determining the time shift between at least two mobile radio modes to enable a multimode mobile terminal to set up a call in accordance with the respective radio access technology associated with each mobile radio mode.

For example, an object of the invention is to enable a mobile terminal to determine the time in the GSM mode while it is operating in the UMTS mode, and vice versa.

Thus the invention more specifically provides a method of switching from a first mobile radio mode to a second mobile radio mode in a multimode mobile radio terminal having a first part and a second part respectively operating in compliance with first and second radio access technologies respectively associated with the first and second mobile radio modes and respectively provided with first and second clocks, the method comprising the following steps:

locking a first part of the mobile terminal to a first mobile radio mode associated with an first clock;
  the mobile terminal calculating the time shift between the clocks of the two mobile radio modes;
  correcting the time of a second part of the terminal using the calculated time shift; and
  switching a second part of the mobile terminal to a second mobile radio mode associated with the second clock.

In an embodiment, calculating the time shift comprises the following steps:

detecting the start of a radio frame of the first radio access technology associated with the first mobile radio mode;
  storing the time indicated by the first clock associated with said first mode and starting a counter;
  detecting the start of a radio frame of the radio access technology associated with the second mobile radio mode;
  storing the updated time indicated by the first clock associated with said first mobile radio mode and the time indicated by the second clock associated with said second mode, and stopping the counter; and
  calculating the time shift from the stored times indicated by the first and second clocks and the value of the counter.

According to a feature, the supply of power to one part of the terminal operating in one mobile radio mode is interrupted and said method includes a step of activation of said one part by a second part operating in another mobile radio mode and a step of updating the time of said activated part of the terminal.

The present invention also provides a multimode mobile radio terminal including a microcontroller and having two parts adapted to communicate in compliance with respective radio access technologies associated with respective different mobile radio modes, the terminal including a counter adapted to count the time that has elapsed between the start of a radio frame of the first technology and the start of a radio frame of the second technology, means for calculating the time shift between said radio access technologies, and means for updating the time of a part of the terminal to the time of the technology associated with said part.

According to a feature the counter has a clock with a shorter period than frame counters of the radio access technologies.

According to a feature the terminal further includes means for switching the power supply of at least part of the terminal at the command of the microcontroller.

BRIEF DESCRIPTION OF THE DRAWINGS

The features and advantages of the invention become clearly apparent on reading the following description, which is given by way of illustrative and non-limiting example and with reference to the accompanying drawing, in which:

FIG. 1 is a diagram showing radio frames in two different radio access technologies (the GSM and UMTS technologies in the example shown);

FIG. 2 is a diagram of the implementation of a method according to the invention; and FIG. 3 is a diagram showing one application of a method according to the present invention.

MORE DETAILED DESCRIPTION

Referring to FIG. 1, it is clear that the time shift between the radio frames of two technologies associated with two different mobile radio modes is not a simple lack of synchronization, but stems from a time shift between their clocks. Thus the respective standards set a duration of 10 ms for radio frames R1 associated with the first technology (for example the UTRAN technology) and a duration of 4.615 ms for radio frames R2 associated with the second technology (for the example GSM technology). The objective of the invention is to enable correct switching from a frame R1 to a frame R2 respectively associated with any two different radio access technologies.

T1 denotes the start of a frame R1 associated with a first mode M1 and T2 the start of a frame R2 associated with a second mode M2. T1' corresponds to the time in the first mode at the start of a frame R2 in the second mode and ΔK expresses the shift between the start of the frames R1 and R2 of the respective modes, in other words:

$$\Delta K = T_1' - T_1 = T_2 - T_1$$

The times the respective radio access technologies associated with each mode are given by clocks U1 and U2 comprising counters fixing the duration of a radio frame and subdividing the frames in time using counters with a higher resolution.

For example, if the first mobile radio mode M1 is associated with the UTRAN technology, the corresponding clock U1 has a superframe number counter SFN and more accurate subframe counters, such as timeslot counters and chip counters. These are standard counters which have clocks with a shorter period than the frame counter and their use is generalized in the UTRAN technology. Similarly, if the second mobile radio mode M2 is associated with the GSM technology, the corresponding clock U2 also has the standard counters that are routinely used, such as frame counters T1, T2, T3, and subframe counters known as timeslot counters and quarter bit counters. All these counters, which are well known to the person skilled in the art, define the precise time in each standardized mobile radio mode. The invention aims to determine the time shift between the timing frames of reference.

FIG. 2 shows a more specific implementation of the invention. A counter ΔK is triggered by the beginning of a frame R1 of a first mode M1 and stopped by the start of a frame R2 of a second mode M2. The counter ΔK is a fast counter, i.e. it has a clock CLK whose period is shorter than those of the frame counters of the two radio access technologies concerned.

The method according to the invention therefore comprises the following steps:

The mobile terminal is locked to a base station using a first radio access technology (for example a UTRAN station). At the start of a frame R1 of the first technology, the time T1 is measured and the counter ΔK is triggered by a signal from a START logical unit.

The mobile terminal monitors radio transmissions of the second radio access technology (for example GSM transmissions) and detects the start of a frame R2 of the second technology. The counter ΔK is then stopped by a signal from the STOP logic unit and the time $T_2$ in the second technology and the updated time $T_1'$ of the first clock U1 are measured.

The microcontroller of the mobile terminal then computes the time shift Δt between the two radio access technologies from the data ΔK, $T_1$, $T_1'$ and $T_2$.

The mobile terminal modifies its clock and can execute measurements or set up a call in accordance with the second radio access technology.

The time $T_1$ is provided by the frame counter associated with the first technology (for example the counters SFN and ΔK for the UMTS technology), the other, higher resolution counters (timeslot and chip counters) being set to zero. Similarly, the time $T_2$ is provided by the frame counter associated with the second technology (for example the counters T1, T2, T3 for the GSM technology), the other, higher resolution counters (timeslot and quarter bit counters) being set to zero. On the other hand, the updated time $T_1'$ is expressed with the aid of subframe counters to indicate a time interval within the period of the frame. The value of the counter ΔK is expressed in time units of one of the radio access technologies, depending on the starting point of the process.

Implementing the method according to the invention in a mobile terminal necessitates the addition of a counter ΔK and logic circuits constituting the START and STOP logic units controlling the counter. This does not give rise to any particular problems.

Thus the invention consists in calculating the time shift Δt between two modes associated with two different radio access technologies in the mobile terminal and at a given time. The shift Δt is not constant, but if the periods of the frames R1 and R2 associated with the radio access technologies and the shift Δt at a given time are known, a knowledge of the time shift between the two mobile radio modes can be maintained.

An advantageous application of the present invention is described with reference to FIG. 3. A multimode mobile radio terminal has parts dedicated to calls in accordance with respective radio access technologies, each of which is associated with a particular mobile radio mode. To guarantee good interworking of the terminal with any radio access technology, as previously described, it is necessary for said terminal to maintain temporal synchronization with each of the radio access technologies that it might be called upon to use.

Thus, in accordance with the invention, a multimode mobile terminal associated with a base station associated with a first mobile radio mode can hold directly in its memory a precise indication of the time in another mobile radio mode.

In a multimode terminal, a microcontroller controls the various parts associated with each mode, for example a UMTS part and a GSM part. When the mobile is locked to a base station associated with a first mode (for example the UTRAN mode), the power supply to the part associated with the second mode (for example the GSM mode) can be interrupted, to save power. When a measurement on a station associated with the second mode is necessary, for example at intervals of about thirty seconds according to the UMTS standard, the party associated with the first mode can activate the second mode via the microcontroller and set the terminal to the time of said second mode.

The part associated with the first mode can maintain the time of the second mode by calculating the time shift Δt at a particular time, as previously described.

Determining the time shift Δt between the two mobile radio modes necessitates waiting for a first event, namely the start of a radio frame associated with the first mode, and waiting for a second event, namely the start of a radio frame associated with the second mode, i.e. waiting for 10+4.615 ms in the present example. Factoring in the time necessary for executing the method according the invention, the time shift Δt is calculated in 20 to 25 ms.

This can have an advantageous practical application, namely interrupting the supply of power to a part of the terminal dedicated to a mode that is not being used, and activating it only when that mode is to be used for a measurement or a call. This is obviously beneficial in terms of power consumption and therefore of mobile terminal battery life. For example, if the GSM part were instead to remain in the standby mode, a measurement would be carried out every 2 ms, although this frequency of measurement is not necessary in the context of the standard.

The description and the drawings refer to the GSM and UTRAN radio access technologies. The present invention can nevertheless be applied to any radio access technologies with different clocks.

What is claimed is:

1. A method of switching from a first mobile radio mode to a second mobile radio mode in a multimode mobile radio terminal having a first part and a second part respectively operating in compliance with first and second radio access technologies respectively associated with the first and second mobile radio modes and respectively provided with first and second clocks, the method comprising the following steps:
    locking a first part of the mobile terminal to a first mobile radio mode associated with a first clock;
    the mobile terminal calculating the time shift between the clocks of the two mobile radio modes;
    correcting the time of a second part of the terminal using the calculated time shift; and
    switching a second part of the mobile terminal to a second mobile radio mode associated with the second clock.

2. A method according to claim 1, wherein calculating the time shift comprises the following steps:
    detecting the start of a radio frame of the first radio access technology associated with the first mobile radio mode;
    storing the time indicated by the first clock associated with said first mode and starting a counter;
    detecting the start of a radio frame of the radio access technology associated with the second mobile radio mode;
    storing the updated time indicated by the first clock associated with said first mobile radio mode and the time indicated by the second clock associated with said second mode, and stopping the counter; and
    calculating the time shift from the stored times indicated by the first and second clocks and the value of the counter.

3. A method according to claim 1, wherein the supply of power to one part of the terminal operating in one mobile radio mode is interrupted and said method includes a step of activation of said one part by a second part operating in another mobile radio mode and a step of updating the time of said activated part of the terminal.

4. A method according to claim 1, wherein the first and second mobile radio modes are respectively the GSM and UMTS modes.

5. A multimode mobile radio terminal including a microcontroller and having two parts adapted to communicate in compliance with respective radio access technologies associated with respective different mobile radio modes, the terminal including a counter adapted to count the time that has elapsed between the start of a radio frame of the first technology and the start of a radio frame of the second technology, means for calculating the time shift between said radio access technologies, and means for updating the time of a part of the terminal to the time of the technology associated with said part.

6. A mobile terminal according to claim 5, wherein the counter has a clock with a shorter period than frame counters of the radio access technologies.

7. A mobile terminal according to claim 5, further including means for switching the power supply of at least a part of the terminal at the command of the microcontroller.

* * * * *